US010664877B1

(12) United States Patent
Feng et al.

(10) Patent No.: US 10,664,877 B1
(45) Date of Patent: May 26, 2020

(54) PRODUCT PROMOTION USING SMART CONTRACTS IN BLOCKCHAIN NETWORKS

(71) Applicant: Alibaba Group Holding Limited, George Town (KY)

(72) Inventors: Zhiyuan Feng, Hangzhou (CN); Yanpeng Li, Hangzhou (CN); Long Cheng, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/671,076

(22) Filed: Oct. 31, 2019

Related U.S. Application Data

(63) Continuation of application No. PCT/CN2019/081719, filed on Apr. 8, 2019.

(51) Int. Cl.
| | | |
|---|---|---|
| G06Q 30/00 | (2012.01) | |
| G06Q 30/02 | (2012.01) | |
| H04L 9/06 | (2006.01) | |
| G06Q 20/40 | (2012.01) | |
| H04L 9/32 | (2006.01) | |

(52) U.S. Cl.
CPC ....... *G06Q 30/0276* (2013.01); *G06Q 20/405* (2013.01); *G06Q 30/0212* (2013.01); *H04L 9/0637* (2013.01); *H04L 9/3247* (2013.01)

(58) Field of Classification Search
None
See application file for complete search history.

(56) References Cited

U.S. PATENT DOCUMENTS

| | | | | |
|---|---|---|---|---|
| 10,291,627 B2 * | 5/2019 | Gleichauf | ............. | H04W 12/06 |
| 10,318,979 B2 * | 6/2019 | Frank | ..................... | G06Q 50/02 |
| 2007/0233544 A1 * | 10/2007 | Frank | ..................... | G06Q 10/10 |
| | | | | 705/310 |
| 2012/0284090 A1 * | 11/2012 | Marins | ............... | G06Q 10/0631 |
| | | | | 705/7.39 |

(Continued)

FOREIGN PATENT DOCUMENTS

| | | |
|---|---|---|
| CN | 108764992 | 11/2018 |
| CN | 108764993 | 11/2018 |
| CN | 109360016 | 2/2019 |

OTHER PUBLICATIONS

STIC NPL Search Report, dated Jan. 24, 2020.*

(Continued)

*Primary Examiner* — Matthew T Sittner
(74) *Attorney, Agent, or Firm* — Fish & Richardson P.C.

(57) ABSTRACT

Disclosed herein are methods, systems, and apparatus, including computer programs encoded on computer storage media, for product promotion using a smart contract in a blockchain network. The method includes: receiving, by a node of a blockchain network, a creation request to create a promotion event, wherein: the promotion event is associated with multiple promotion codes and a pair of a private key and a public key, and the creation request includes the public key and a digital signature generated using the private key; determining, by the node and based on the public key and the digital signature, validity of the creation request; and in response to determining that the creation request is valid, registering, by the node, the promotion event in the blockchain network using a smart contract without storing the multiple promotion codes in the blockchain network.

24 Claims, 6 Drawing Sheets

(56) References Cited

U.S. PATENT DOCUMENTS

| | | | | |
|---|---|---|---|---|
| 2013/0282462 | A1* | 10/2013 | Xu | G06Q 30/0238 |
| | | | | 705/14.26 |
| 2013/0346191 | A1* | 12/2013 | Morris | G06Q 30/0225 |
| | | | | 706/14.47 |
| 2016/0012424 | A1* | 1/2016 | Simon | G06Q 20/3674 |
| | | | | 705/67 |
| 2016/0179482 | A1* | 6/2016 | Kramer | G06F 8/34 |
| | | | | 717/107 |
| 2017/0005804 | A1* | 1/2017 | Zinder | H04L 9/3247 |
| 2017/0103472 | A1* | 4/2017 | Shah | G06K 9/00597 |
| 2017/0140408 | A1 | 5/2017 | Wuehler | |
| 2017/0243193 | A1* | 8/2017 | Manian | G06Q 20/3829 |
| 2017/0257358 | A1* | 9/2017 | Ebrahimi | H04L 63/0861 |
| 2017/0352012 | A1* | 12/2017 | Hearn | H04L 9/3297 |
| 2017/0358041 | A1* | 12/2017 | Forbes, Jr. | G06Q 20/102 |
| 2017/0364825 | A1* | 12/2017 | Tiell | G06Q 10/0635 |
| 2018/0005186 | A1* | 1/2018 | Hunn | G06F 40/103 |
| 2018/0137512 | A1* | 5/2018 | Georgiadis | G06Q 20/065 |
| 2018/0158087 | A1* | 6/2018 | Robinson | G06Q 30/0207 |
| 2018/0167200 | A1* | 6/2018 | High | A61B 5/6802 |
| 2018/0181979 | A1* | 6/2018 | Frank | G06Q 50/02 |
| 2018/0227116 | A1* | 8/2018 | Chapman | H04L 9/0643 |
| 2018/0227131 | A1* | 8/2018 | Ebrahimi | G06Q 20/3827 |
| 2018/0268401 | A1 | 9/2018 | Ortiz et al. | |
| 2019/0018984 | A1* | 1/2019 | Setty | H04L 63/123 |
| 2019/0043138 | A1* | 2/2019 | Blake | G06Q 20/34 |
| 2019/0081789 | A1 | 3/2019 | Madisetti et al. | |
| 2019/0215163 | A1* | 7/2019 | Suleiman | H04L 9/14 |
| 2019/0236214 | A1* | 8/2019 | Kokernak | G06F 16/1734 |
| 2019/0251591 | A1* | 8/2019 | Frank | G06Q 30/0217 |
| 2019/0279257 | A1* | 9/2019 | Kokernak | G06Q 30/0277 |
| 2019/0281449 | A1* | 9/2019 | Luo | H04L 63/06 |
| 2019/0303623 | A1* | 10/2019 | Reddy | G06F 16/27 |
| 2019/0303886 | A1* | 10/2019 | Kikinis | G06Q 20/065 |
| 2019/0333031 | A1* | 10/2019 | Kravitz | G06Q 20/4014 |
| 2019/0333096 | A1* | 10/2019 | Johnson | H04L 9/3239 |
| 2019/0370866 | A1* | 12/2019 | Lawbaugh | H04L 9/0637 |
| 2019/0370905 | A1* | 12/2019 | Hu | G06Q 40/08 |
| 2019/0378152 | A1* | 12/2019 | Zhang | G06Q 20/06 |
| 2020/0005349 | A1* | 1/2020 | Brody | G06Q 30/0215 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

PCT International Search Report and Written Opinion in International Application No. PCT/CN2019/081719, dated Jan. 14, 2020, 6 pages.

Extended European Search Report in European Appln No. 19732235.7, dated Apr. 3, 2020, 8 pages.

* cited by examiner

US 10,664,877 B1

PRODUCT PROMOTION USING SMART CONTRACTS IN BLOCKCHAIN NETWORKS

CROSS-REFERENCE TO RELATED APPLICATIONS

This application is a continuation of PCT Application No. PCT/CN2019/081719, filed on Apr. 8, 2019, which is hereby incorporated by reference in its entirety.

TECHNICAL FIELD

This specification relates to product promotion using smart contracts in blockchain networks.

BACKGROUND

Distributed ledger systems (DLSs) enable participating entities to securely and immutably store data. DLSs can also be referred to as consensus networks or blockchain networks, without referencing any particular use case. Examples of blockchain networks can include consortium blockchain networks provided for a select group of entities. A consortium blockchain network can control the consensus process for the select group of entities. The consortium blockchain network includes an access control layer.

A coupon is a type of marketing means endorsed by merchants, through which consumers can obtain cheaper products or services. In turn, merchants can get more customers. Coupons can include printed coupons or electronic coupons. When issuing electronic coupons, merchants often generate and associate unique identifiers with the coupons. The unique identifiers can also referred to as "coupon codes." Typically, the unique identifiers are stored in a centralized data store. Consumers can obtain a unique identifier of a coupon through relevant products and then redeem the corresponding rewards. If the centralized data store is invaded, hacked, or otherwise impaired, coupon information may be leaked, resulting in invalid activities, serious financial losses, and other consequences. In some instances, the unique identifier can be guessed or otherwise deciphered.

It is desirable to have an effective means to protect the coupons from being leaked, maliciously deciphered, and other consequences.

SUMMARY

This specification describes technologies for product promotion using a smart contract in a blockchain network.

Implementations of this specification are directed to implementing product promotion events using a smart contract in a blockchain network (referred to as a smart contract-based promotion event). In some embodiments, a merchant (e.g., a brand owner, a retailer, or a manufacturer) of one or more products (e.g., including one or more goods and services) can create a promotion event, for example, for marketing purposes. In some embodiments, a merchant can issue a number of digital or electronic tickets (e.g., an electronic voucher, an electronic coupon, or an electronic gift certificate) for the promotion event.

In some embodiments, a smart contract can be used to implement the promotion event in a blockchain network to facilitate the creation of promotion events by the merchant and redemption of a digital ticket by a consumer. In some embodiments, the smart contract-based promotion event can save storage space needed for storing a large number of digital tickets. In some embodiments, the smart contract-based promotion event can circumvent computational bottleneck of concurrently uploading the digital tickets to the blockchain network. In some embodiments, the smart contract-based promotion event can provide enhanced data security for protecting the digital tickets from being leaked or maliciously deciphered.

This specification also provides one or more non-transitory computer-readable storage media coupled to one or more processors and having instructions stored thereon which, when executed by the one or more processors, cause the one or more processors to perform operations in accordance with embodiments of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

It is appreciated that methods in accordance with this specification may include any combination of the aspects and features described herein. That is, methods in accordance with this specification are not limited to the combinations of aspects and features specifically described herein, but also include any combination of the aspects and features provided.

The details of one or more embodiments of this specification are set forth in the accompanying drawings and the description below. Other features and advantages of this specification will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
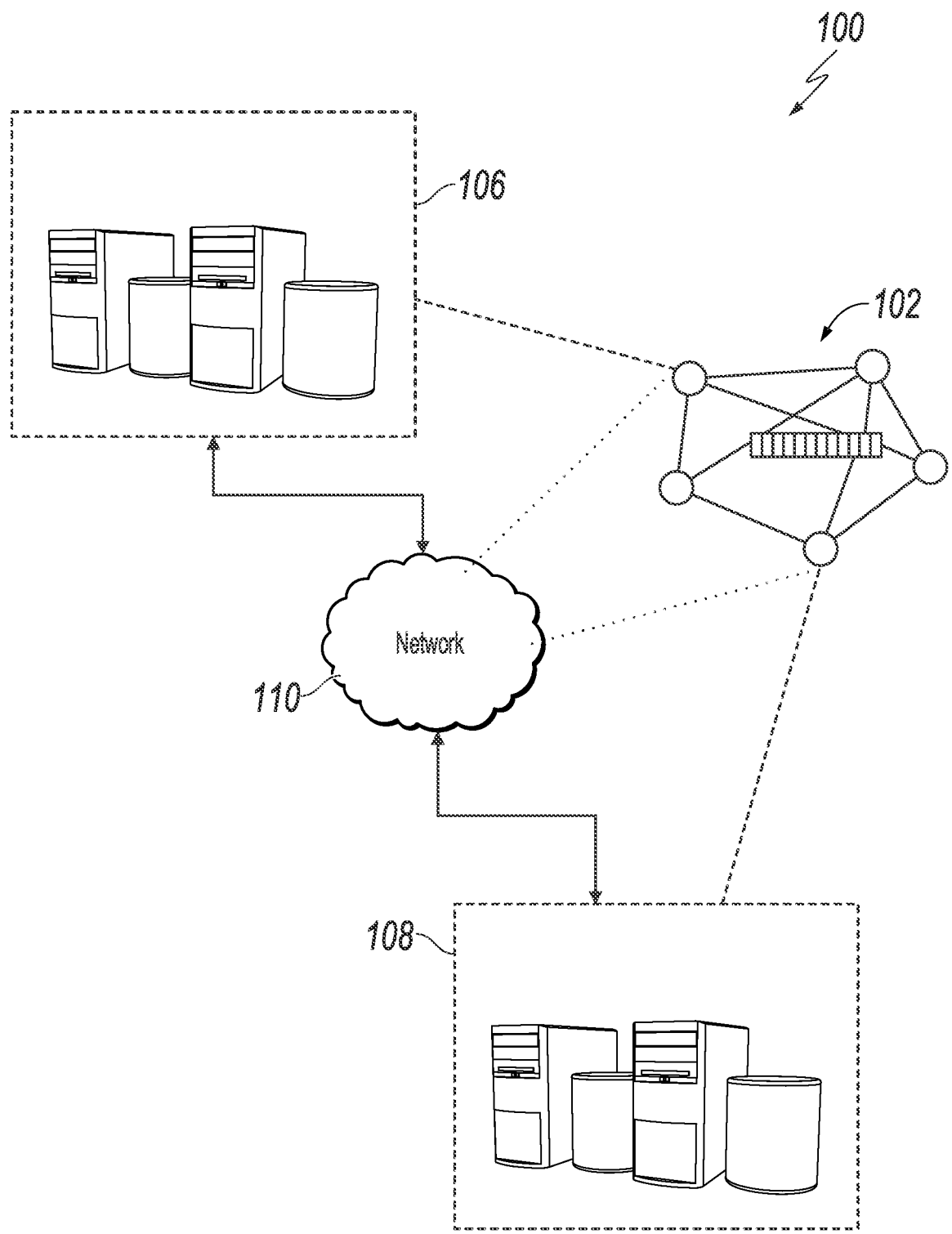
FIG. 1 is a diagram illustrating an example of an environment that can be used to execute embodiments of this specification.

Implementations of this specification are directed to implementing product promotion events using a smart contract in a blockchain network (referred to as a smart contract-based promotion event). In some embodiments, a merchant (e.g., a brand owner, a retailer, a wholesaler, or a manufacturer) of one or more products (e.g., including one or more goods and/or services) can create a promotion event, for example, for marketing purposes. In some embodiments, a merchant can issue a number of digital or electronic tickets (e.g., an electronic voucher, an electronic coupon, an electronic gift certificate, or an electronic red envelope) for the promotion event.

In some embodiments, a smart contract can be used to implement the promotion event in a blockchain network to facilitate the creation of promotion events by the merchant and redemption of a digital ticket by a consumer. In some embodiments, the smart contract-based promotion event can save storage space needed for storing a large number of digital tickets. In some embodiments, the smart contract-based promotion event can circumvent computational bottleneck of concurrently uploading the digital tickets to the blockchain network. In some embodiments, the smart contract-based promotion event can provide enhanced data security for protecting the digital tickets from being leaked or maliciously deciphered.

To provide further context for embodiments of this specification, and as introduced above, distributed ledger systems (DLSs), which can also be referred to as consensus networks (e.g., made up of peer-to-peer nodes), and blockchain networks, enable participating entities to securely and immutably conduct transactions and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, transactions recorded on a blockchain are reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. The transactions, which have already been verified by the nodes of the blockchain network, are hashed and encoded into a Merkle tree. A Merkle tree is a data structure in which data at the leaf nodes of the tree is hashed, and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining whether it is consistent with the structure of the tree.

Whereas a blockchain is a decentralized or at least partially decentralized data structure for storing transactions, a blockchain network is a network of computing nodes that manage, update, and maintain one or more blockchains by broadcasting, verifying, and validating transactions, etc. As introduced above, a blockchain network can be provided as a public blockchain network, a private blockchain network, or a consortium blockchain network. Embodiments of this specification are described in further detail herein with reference to a consortium blockchain network. It is contemplated, however, that embodiments of this specification can be realized in any appropriate type of blockchain network.

In general, a consortium blockchain network is private among the participating entities. In a consortium blockchain network, the consensus process is controlled by an authorized set of nodes, which can be referred to as consensus nodes, one or more consensus nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network.

In some examples, within a consortium blockchain network, a global blockchain is provided as a blockchain that is replicated across all nodes. That is, all consensus nodes are in perfect state consensus with respect to the global blockchain. To achieve consensus (e.g., agreement to the addition of a block to a blockchain), a consensus protocol is implemented within the consortium blockchain network. For example, the consortium blockchain network can implement a practical Byzantine fault tolerance (PBFT) consensus, described in further detail below.

FIG. 1 is a diagram illustrating an example of an environment 100 that can be used to execute embodiments of this specification. In some examples, the environment 100 enables entities to participate in a consortium blockchain network 102. The environment 100 includes computing devices 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link. In some examples, the network 110 enables communication with, and within the consortium blockchain network 102. In general the network 110 represents one or more communication networks. In some cases, the computing devices 106, 108 can be nodes of a cloud computing system (not shown), or each computing device 106, 108 can be a separate cloud computing system including a number of computers interconnected by a network and functioning as a distributed processing system.

In the depicted example, the computing systems 106, 108 can each include any appropriate computing system that enables participation as a node in the consortium blockchain network 102. Examples of computing devices include, without limitation, a server, a desktop computer, a laptop computer, a tablet computing device, and a smartphone. In some examples, the computing systems 106, 108 host one or more computer-implemented services for interacting with the consortium blockchain network 102. For example, the computing system 106 can host computer-implemented services of a first entity (e.g., user A), such as a transaction management system that the first entity uses to manage its transactions with one or more other entities (e.g., other users). The computing system 108 can host computer-implemented services of a second entity (e.g., user B), such as a transaction management system that the second entity uses to manage its transactions with one or more other entities (e.g., other users). In the example of FIG. 1, the consortium blockchain network 102 is represented as a peer-to-peer network of nodes, and the computing systems 106, 108 provide nodes of the first entity, and second entity respectively, which participate in the consortium blockchain network 102.

Figure 2:
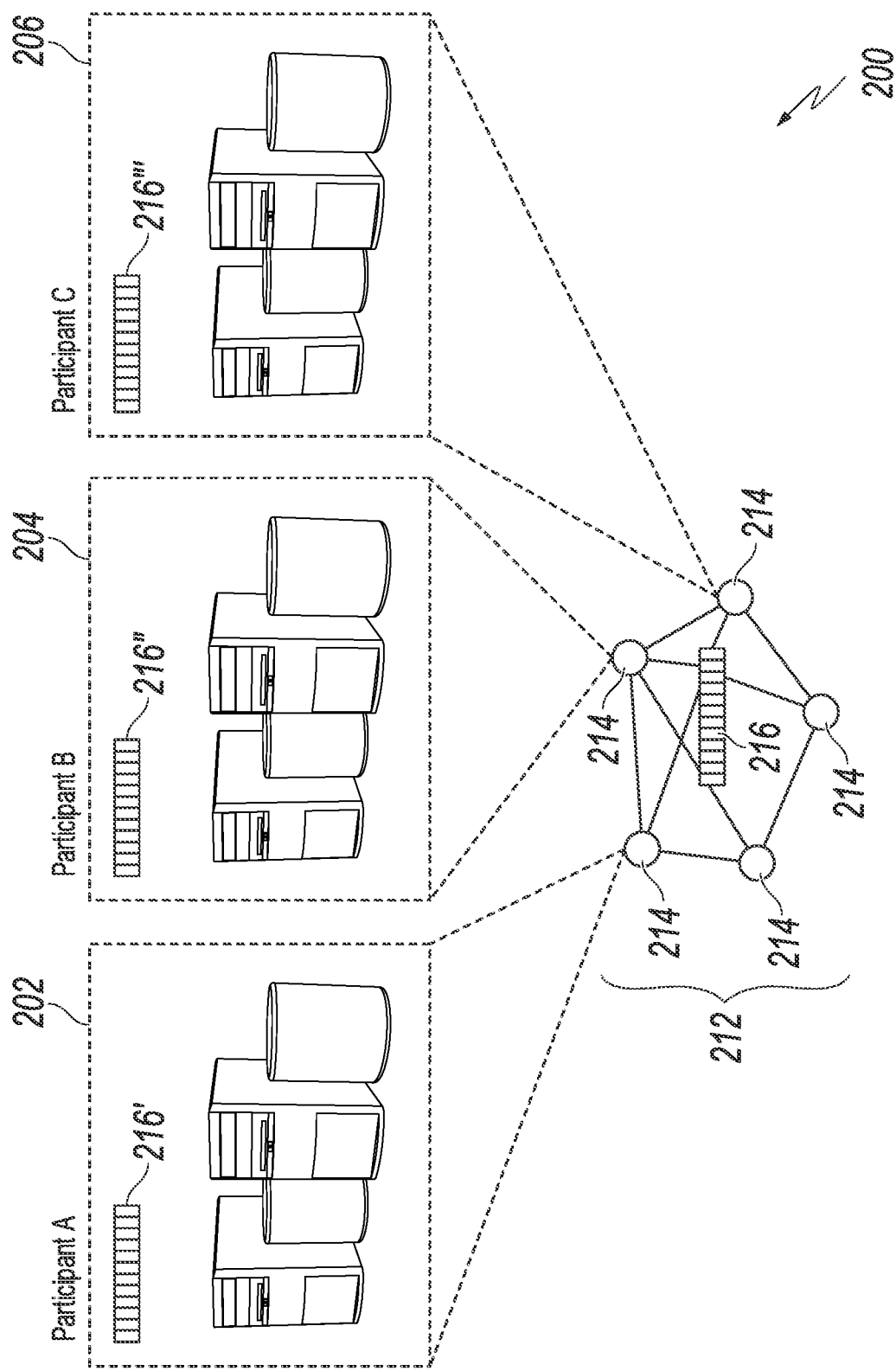
FIG. 2 is a diagram illustrating an example of an architecture in accordance with embodiments of this specification.

FIG. 2 depicts an example of an architecture 200 in accordance with embodiments of this specification. The example architecture 200 includes participant systems 202, 204, 206 that correspond to Participant A, Participant B, and Participant C, respectively. Each participant (e.g., user, enterprise) participates in a blockchain network 212 provided as a peer-to-peer network including multiple nodes 214, at least some of which immutably record information in a blockchain 216. Although a single blockchain 216 is schematically depicted within the blockchain network 212, multiple copies of the blockchain 216 are provided, and are maintained across the blockchain network 212, as described in further detail herein.

In the depicted example, each participant system 202, 204, 206 is provided by, or on behalf of, Participant A, Participant B, and Participant C, respectively, and functions as a respective node 214 within the blockchain network. As used herein, a node generally refers to an individual system (e.g., computer, server) that is connected to the blockchain network 212, and enables a respective participant to participate in the blockchain network. In the example of FIG. 2, a participant corresponds to each node 214. It is contemplated, however, that a participant can operate multiple nodes 214 within the blockchain network 212, and/or multiple participants can share a node 214. In some examples, the participant systems 202, 204, 206 communicate with, or through the blockchain network 212 using a protocol (e.g., hypertext transfer protocol secure (HTTPS)), and/or using remote procedure calls (RPCs).

Nodes 214 can have varying degrees of participation within the blockchain network 212. For example, some nodes 214 can participate in the consensus process (e.g., as minder nodes that add blocks to the blockchain 216), while other nodes 214 do not participate in the consensus process. As another example, some nodes 214 store a complete copy of the blockchain 216, while other nodes 214 only store copies of portions of the blockchain 216. For example, data access privileges can limit the blockchain data that a respective participant stores within its respective system. In the example of FIG. 2, the participant systems 202, 204 store respective, complete copies 216', 216" of the blockchain 216.

A blockchain (e.g., the blockchain 216 of FIG. 2) is made up of a chain of blocks, each block storing data. Examples of data include transaction data representative of a transaction between two or more participants. While transactions are used herein by way of non-limiting example, it is contemplated that any appropriate data can be stored in a blockchain (e.g., documents, images, videos, audio). Examples of a transaction can include, without limitation, exchanges of something of value (e.g., assets, products, services, currency). The transaction data is immutably stored within the blockchain. That is, the transaction data cannot be changed.

Before storing in a block, the transaction data is hashed. Hashing is a process of transforming the transaction data (provided as string data) into a fixed-length hash value (also provided as string data). It is not possible to un-hash the hash value to obtain the transaction data. Hashing ensures that even a slight change in the transaction data results in a completely different hash value. Furthermore, and as noted above, the hash value is of fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, the consensus node generates a block header, hashes all of the transactions in the block, and combines the hash value in pairs to generate further hash values until a single hash value is provided for all transactions in the block (the Merkle root hash). This hash is added to the block header. The consensus node also determines the hash value of the most recent block in the blockchain (i.e., the last block added to the blockchain). The consensus node also adds a nonce value, and a timestamp to the block header.

In general, PBFT provides a practical Byzantine state machine replication that tolerates Byzantine faults (e.g., malfunctioning nodes, malicious nodes). This is achieved in PBFT by assuming that faults will occur (e.g., assuming the existence of independent node failures, and/or manipulated messages sent by consensus nodes). In PBFT, the consensus nodes are provided in a sequence that includes a primary consensus node, and backup consensus nodes. The primary consensus node is periodically changed, Transactions are added to the blockchain by all consensus nodes within the blockchain network reaching an agreement as to the world state of the blockchain network. In this process, messages are transmitted between consensus nodes, and each consensus nodes proves that a message is received from a specified peer node, and verifies that the message was not modified during transmission.

In PBFT, the consensus protocol is provided in multiple phases with all consensus nodes beginning in the same state. To begin, a client sends a request to the primary consensus node to invoke a service operation (e.g., execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

In some blockchain networks, cryptography is implemented to maintain privacy of transactions. For example, if two nodes want to keep a transaction private, such that other nodes in the blockchain network cannot discern details of the transaction, the nodes can encrypt the transaction data. An example of cryptography includes, without limitation, symmetric encryption, and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can en-/de-crypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 2, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 2, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

In some blockchain networks, so-called smart contracts can be executed. Smart contracts can be described as digital representations of real-world, legal contracts having contractual terms affecting various parties. A smart contract is implemented, stored, updated (as needed), and executed within, in the example context, a consortium blockchain network. Contract parties associated with the smart contract (e.g., buyers and sellers) are represented as nodes in the consortium blockchain network. In some examples, the contract parties can include entities (e.g., business enterprises) that are associated with the smart contract (e.g., as parties to the smart contract).

In further detail, smart contracts are provided as computer-executable programs that execute on blockchains (e.g., a node within a blockchain network). A smart contract contains a set of pre-defined rules under which the parties to that smart contract agree to interact with each other. If the pre-defined rules of the smart contract are met, the agreement defined in the smart contract is automatically enforced. A smart contract is usually tamper resistant and facilitates, verifies, and enforces the negotiation or performance of an agreement or transaction.

Figure 3:
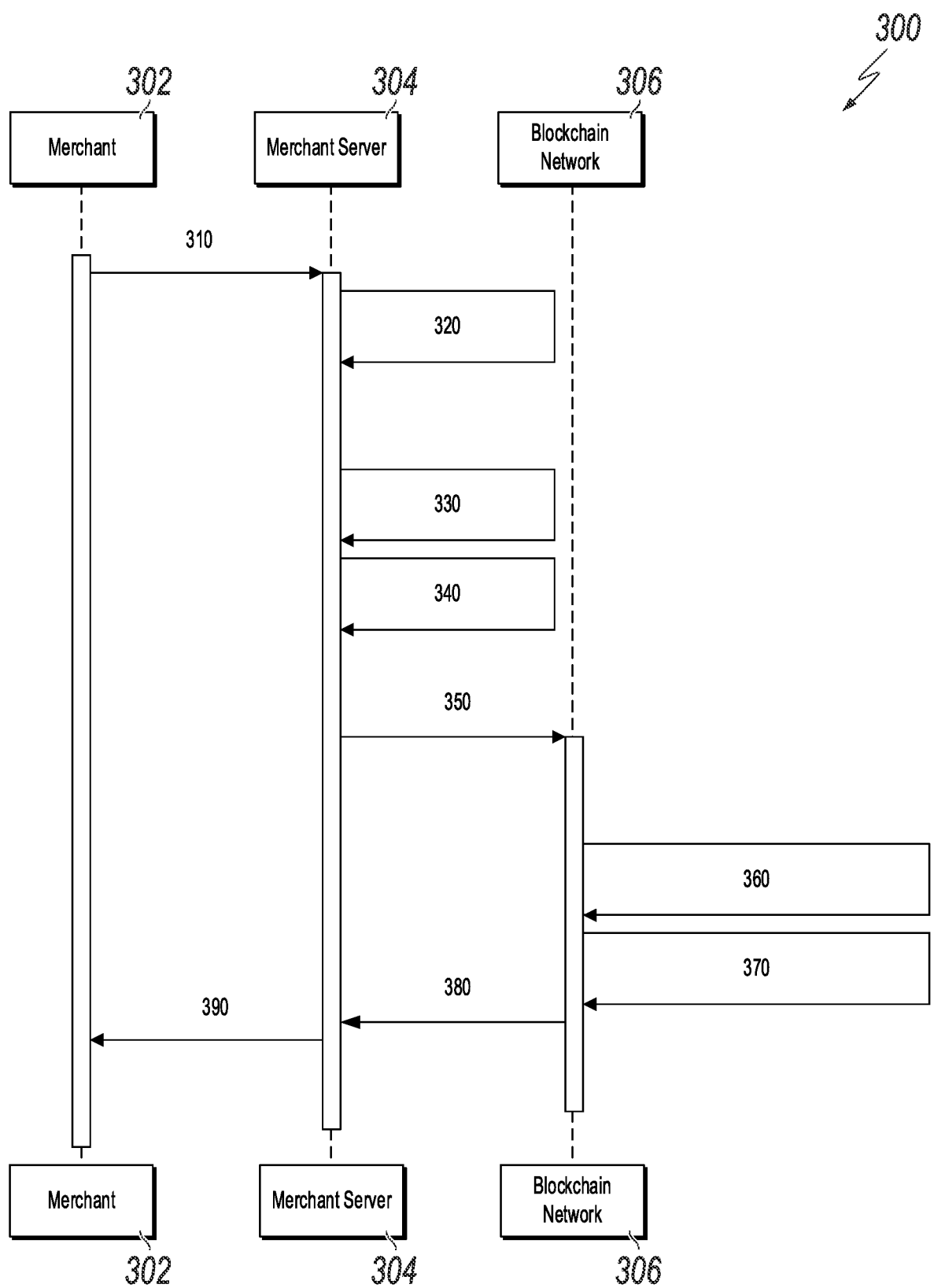
FIG. 3 is a diagram illustrating examples of operations for creating a product promotion event using a smart contract in a blockchain network, in accordance with embodiments of this specification.

FIG. 3 is a diagram 300 illustrating examples of operations for creating a promotion event using a smart contract in a blockchain network, in accordance with embodiments of this specification. For convenience, the process will be described as being performed by a system of one or more computers, located in one or more locations, and programmed appropriately in accordance with this specification. For example, a distributed system (e.g., the blockchain environment 100 of FIG. 1), appropriately programmed, can perform the process. The system can include a merchant 302, a merchant server 304, and a blockchain network 306. The merchant 302 can be, for example, a brand owner, a retailer, manufacture, a trading platform, or another entity that can create a promotion event for one more products (e.g., including one or more goods and/or services). The merchant 302 can access, operate on, or otherwise be associated with a merchant server 304 for creating the promotion event. The merchant server 304 can be one or more computers or data processing apparatuses that can access or be otherwise communicatively coupled with the blockchain network 306. In some embodiments, the merchant server 304 can be a node (e.g., a client node, a consensus node, or a non-consensus node) of the blockchain network 306. In some embodiments, the merchant server 304 can generate one or more smart contracts and submit the one or more smart contracts to the blockchain network 306. In some embodiments, the merchant server 304 can be a deploy server of one or more smart contracts in the blockchain network 306, for example, by submitting a transaction of the smart contract to the blockchain network 306. In some embodiments, the smart contract can be deployed in the blockchain network 306 in a distributed manner and has a unique smart contract address from which the smart contract can be called. In some embodiments, one or more smart contracts have been defined and deployed in the blockchain network 306, and the merchant server 304 can call one or more operations defined in the one or more contracts.

As illustrated, at 310, the merchant 302 sends a request to the merchant server 304 for creating a promotion event in the blockchain network 306. The promotion event can be used, for example, for promoting or marketing of one or more products. In some embodiments, a large number of (e.g., in the order of tens, hundreds, thousands, and beyond) electronic or digital tickets can be issued or endorsed by the merchant 302 to offer discount or other promotion benefits to consumers on the one or more products of the promotion events. A digital ticket is generally a virtual instance of a ticket for claiming goods or services. Examples of a digital ticket can include an electronic voucher having certain monetary value and that can be exchanged for goods and services, an electronic coupon that can be used by consumers (or customers) at the time of consumption to purchase a product at a discounted price according to a discount rate indicated by the coupon, or an electronic gift certificate that can be used for goods or services at specified merchants, among others.

In some embodiments, each digital ticket is associated with a unique identifier. The unique identifiers can also referred to as "promotion codes," "promotional codes," "coupon codes," "discount codes," "keycodes," "promo codes," "surplus codes," "portable codes," "shopping codes," "voucher codes," "reward codes," "discount vouchers," "referral codes," or "source codes."

The merchant server 304 can set, define, or otherwise configure rules of the promotion event. The rules of the promotion event can include, for example, one or more of: an identifier (ID) (e.g., a name or a code) of the promotion event, a rule of digital tickets, an authentication rule of the digital tickets, a valid duration of the promotion event, a region of the promotion event, information of an applicable product of the promotion event, or a qualification of a consumer for redemption the digital tickets.

For example, at 320, the merchant server 304 can set, define, or otherwise configure rules of digital tickets. Example rules of the digital tickets can include, for example, a type of the digital ticket (e.g., an electronic coupon, an electronic voucher, an electronic gift certificate, or an electronic red envelop, among others), a type of reward or benefit of the digital ticket (e.g., discount, cash, credit, rebate, and/or additional products), a winning rule or criterion, a total number of the of promotion codes, a value range of the promotion codes, a type of each of the multiple promotion codes, or a spelling rule of a valid promotion code.

For example, at 330, the merchant server 304 can set, define, or otherwise configure an authentication rule of the digital tickets. In some embodiments, each valid digital ticket endorsed by the merchant 302 can be authenticated or verified based on digital signature technology. For example, the merchant 302 or the promotion event of the merchant 302 can be assigned a pair of private key and public key. Each valid digital ticket endorsed by the merchant 302 can be signed by, for example, by the merchant server 304 using the private key of the merchant 302 or a private key of the particular promotion event of the merchant 302. Third parties can verify the digital ticket using the corresponding public key of the merchant 302 or the particular promotion event of the merchant 302. In some embodiments, the authentication rule of the digital tickets can define information (e.g., the promotion code and other information, if any, such as the ID of the promotion event) to be included in generating a digital signature using the private key of the merchant 302 or a private key of the particular promotion event of the merchant 302.

In some embodiments, the digital signature of the promotion code can provide enhanced data security. For example, even if a third party deciphers the spelling rule of the promotion code, the third party cannot generate a valid signature of the promotion code without the private key of the private key of the merchant 302 or the private key of the particular promotion event of the merchant 302. Accordingly, any promotion code generated by the third party cannot be validated.

For example, at 340, the merchant server 304 can set, define, or otherwise configure the valid duration of the promotion event, for example, by configuring an expiration time or a count-based expiration rule of the promotion event. In some embodiments, the merchant server 304 can configure additional or different rules of the promotion event.

At 350, the merchant server 304 sends a request to the blockchain network 306 for creating a promotion event in the blockchain network 306. The request can include, for example, the ID of the promotion event, rules of the promotion event, a digital signature of the request, and/or other information.

Upon receiving the request from the merchant server 304, the blockchain network 306 can, for example, at 360, determine validity of the promotion event. In some embodiments, the validity of the promotion event can be determined, for example, by evoking a promotion event verification operation defined in the smart contract. For example, the promotion event verification operation can receive information (e.g., the rules) of the promotion event, compare it with certain regulations (e.g., of the blockchain network 306 or a governing body such as the government), and determine if the promotion event complies with the regulations.

At 370, in response to determining that the promotion event is valid, the blockchain network 306 can register the promotion event, for example, by storing the rules of the promotion event in the blockchain network 306. As such, a smart contract can be executed according to the rules of the promotion event to perform various operations of the promotion event, such as, redemption of one or more digital tickets of the promotion event.

Note that the promotion codes of the digital tickets of the promotion event are not stored in the blockchain network 306. In this way, storage space is saved. Moreover, it relieves the blockchain network 306 from concurrently uploading into the blockchain network 306 a large number of the promotion codes of the promotion event. It also prevents the leak of the promotion codes.

In some embodiments, in response to determining that the promotion event is invalid, the blockchain network 306 can reject the creation of the promotion event.

At 380, the blockchain network 306 can send a notification to the merchant server 304 indicating a result of the creation of the promotion event. In some embodiments, the notification can be an acknowledgement indicating that the promotion event has been successfully created in the blockchain network 306. In some embodiments, the notification can be a notification indicating that the promotion event has not been successfully created in the blockchain network 306, with or without detailed information on why the promotion event has not been successfully created in the blockchain network 306.

At 390, the merchant server 304 can send a response to the merchant 302 according to the notification from the blockchain network 306, indicating the result of the creation of the promotion event.

Figure 4:
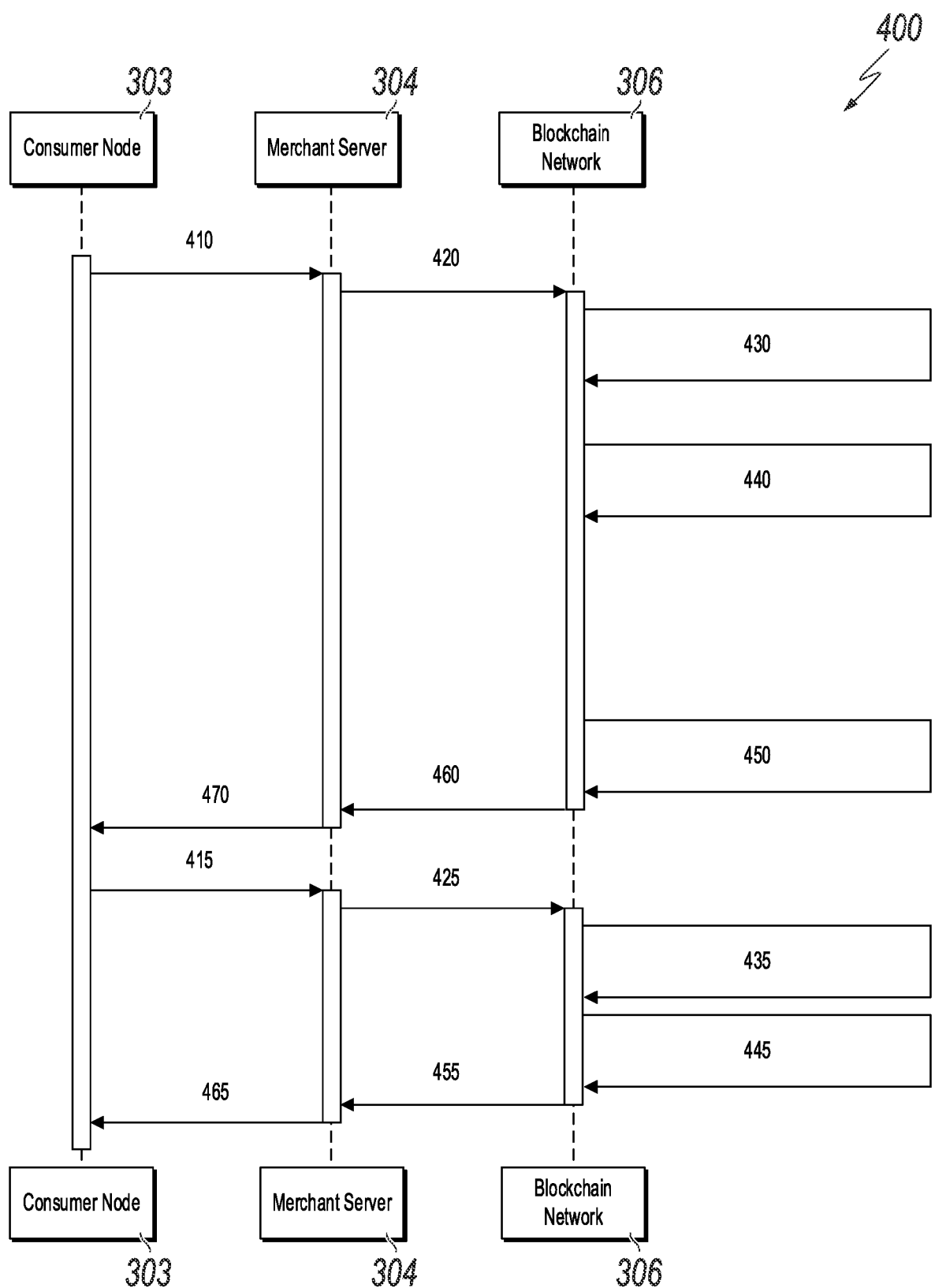
FIG. 4 is a diagram illustrating examples of operations for redeeming a promotion code of a product promotion event implemented using a smart contract in a blockchain network, in accordance with embodiments of this specification.

FIG. 4 is a diagram 400 illustrating examples of operations for redeeming a promotion code of a product promotion event implemented using a smart contract in a blockchain network, in accordance with embodiments of this specification. For convenience, the process will be described as being performed by a system of one or more computers, located in one or more locations, and programmed appropriately, in accordance with this specification. For example, a distributed system (e.g., the blockchain environment 100 of FIG. 1), appropriately programmed, can perform the process. The system can include a consumer 303, a merchant server 304, and a blockchain network 306. The consumer node 303 can be, for example, one or more computers or data processing apparatuses that can be accessed or operated by, or be otherwise associated with a person or another entity that has obtained a promotion code of a promotion event of the merchant 302. In some embodiments, the consumer node 303 can obtain the promotion code and/or other information such as an ID of the promotion event and a digital signature of the promotion code. In some embodiments, the consumer node 303 can obtain the promotion code and/or other information in an encrypted or otherwise transformed form.

In some embodiments, the consumer node 303 can communicate with the merchant server 304 for redeeming a promotion code of the promotion event. For example, the consumer node 303 can be a mobile device of a consumer that has scanned a QR code that includes a promotion code of a promotion event. In some embodiments, the QR code also includes other information such as an ID of the promotion event and a digital signature of the promotion code. In some embodiments, upon the scanning the QR code, a request for redeeming the promotion code of the promotion event can be automatically transmitted to the merchant server 304.

For example, as illustrated in FIG. 4, at 410, the consumer node 303 sends a redemption request to the merchant server 304 for redeeming the promotion code of the promotion event. In some embodiments, the merchant server 304 can first determine the validity of the redemption request. For example, the merchant server 304 can identify the promotion code and the corresponding promotion event (e.g., based on the ID of the promotion code) and determine if the promotion code complies with the rules of the promotion event.

At 420, the merchant server 304 sends the redemption request to the blockchain network 306. In some embodiments, the merchant server 304 sends the redemption request to the blockchain network 306 only if the merchant server 304 determines the validity of the redemption request. In some embodiments, the merchant server 304 does not check the validity of the redemption request and forwards the redemption request to the blockchain network 306 after receiving the redemption request.

At 430, the blockchain network 306 identifies a registered promotion event with the redemption request, for example, by matching the ID of the promotion event in the redemption request with an ID of the registered promotion event.

At 440, the blockchain network 306 determines validity of the promotion code in the redemption request. In some embodiments, the validity of the promotion code can be determined, for example, by evoking a promotion code verification operation defined in the smart contract. For example, the promotion code verification operation can receive the promotion code and/or other information in the redemption request, and compare it with the rules of the registered promotion event, and determine if the promotion code complies with the rules of the registered promotion event. In some embodiments, determining the validity of the promotion code in the redemption request can include determining the validity of the digital signature included in the redemption request, the expiration date of the promotion code, and the qualification of the consumer associated with the consumer node 303, or any other determinations.

At 450, in response to determining that the promotion code is valid, the blockchain network 306 can record the promotion code and/or its related information. In some embodiments, the blockchain network 306 can record that the promotion code has been redeemed, the time, location, or other information of the redemption, the consumer and/or consumer node 303 that redeems the promotion code. In some embodiments, the consumer identity that redeems the promotion code can be recorded and used for subsequent redemption record inquiry. In some embodiments, the blockchain network 306 can mark the promotion code as invalid after the redemption if the promotion code is valid for a single use, or record the number of redemptions if the promotion code is valid for multiple uses.

At 460, the blockchain network 306 can send a notification to the merchant server 304 indicating a success of the redemption of the promotion code.

At 470, the merchant server 304 can return an acknowledgment of the success of the redemption of the promotion code to the consumer node 303 and allow granting corresponding rewards or benefits of the promotion code to the consumer.

As another example, at 415, the consumer node 303 sends a second redemption request to the merchant server 304 for redeeming a second promotion code of a second promotion event. Typically, the second redemption request is received by the merchant server 304 at a different time from when the redemption request is sent to the merchant server 304 at 410. In some embodiments, the second promotion code can be the same or different from the promotion code discussed at 410. In some embodiments, the second promotion event can be the same or different from the promotion event discussed at 410.

At 425, the merchant server 304 sends the second redemption request to the blockchain network 306. In some embodiments, the merchant server 304 sends the second redemption request to the blockchain network 306 only if the merchant server 304 determines the validity of the second redemption request. In some embodiments, the merchant server 304 does not check the validity of the second redemption request and forwards the second redemption request to the blockchain network 306 after receiving the second redemption request.

At 435, the blockchain network 306 identifies a registered promotion event with the second redemption request, for example, by matching the ID of the promotion event in the second redemption request with an ID of the registered promotion event.

At 445, the blockchain network 306 determines the validity of the second promotion code in the second redemption request. In some embodiments, the validity of the promotion code can be determined, for example, by evoking a promotion code verification operation defined in the smart contract. For example, the promotion code verification operation can receive the second promotion code and/or other information in the second redemption request, compare it with the rules of the registered promotion event, and determine if the second promotion code complies with the rules of the registered promotion event. For example, determining the validity of the second promotion code in the second redemption request can include determining the validity of the digital signature included in the second redemption request, the expiration date of the second promotion code, and the qualification of the consumer associated with the consumer node 303, or any other determinations.

At 455, the blockchain network 306 determines that the second promotion code is invalid or the second promotion code has been redeemed. In this case, the blockchain network 306 can send a notification to the merchant server 304 indicating a failure or error of the redemption of the second promotion code, with or without detailed information on reasons of the failure or error of the redemption of the second promotion code.

At 465, the merchant server 304 can return a rejection of the redemption of the second promotion code to the consumer node 303. In some embodiments, the merchant server 304 can notify the consumer detailed information on the reasons of the failure or error of the redemption of the second promotion code. In some embodiments, the consumer node 303 can submit a redemption record inquiry, for example, if being notified that the failure or error of the redemption is because the second promotion code has already been redeemed. In some embodiments, if there is a doubt about the redemption record, the consumer or third parties can file a report to the merchant. In some embodiments, the transparency, security, and immutability of data storage of the blockchain network 306 can enable the trace of the redemption record or history of the promotion code of the promotion event, for example, to determine whether there is any problem or irregularity.

Figure 5:
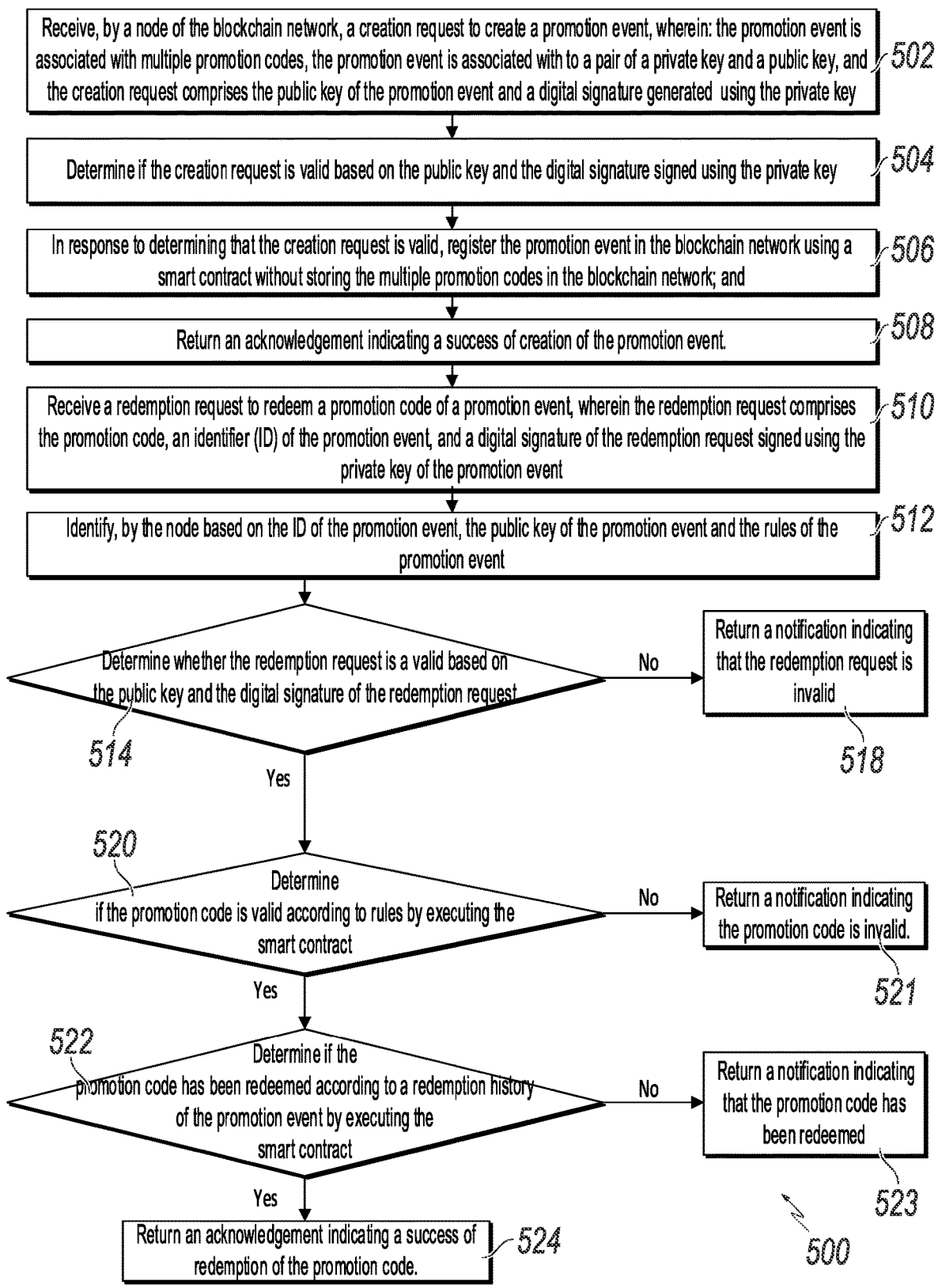
FIG. 5 depicts an example of a process for product promotion using smart contracts in a blockchain network in accordance with embodiments of this specification.

FIG. 5 depicts an example of a process 500 for product promotion using smart contracts in a blockchain network in accordance with embodiments of this specification. The process 500 may be performed using one or more computer-executable programs executed using one or more computing devices. In some embodiments, the process 500 can be performed by a distributed system (e.g., the blockchain system 100 of FIG. 1) for product promotion using smart contracts in a blockchain network. For convenience, the process 500 will be described as being performed by a system of one or more computers, located in one or more locations, and programmed appropriately, in accordance with this specification. For example, a distributed system, e.g., the blockchain environment 100 of FIG. 1, appropriately programmed, can perform the process 500. In some embodiments, some or all operations of the process 500 can be performed by a node such as a consensus node of a blockchain network. For example, e.g., node 214 of the architecture 200, appropriately programmed, can perform some or all operations of the process 500. The node can be implemented, for example, using one or more computing devices (e.g., computing devices 106, 108). In some embodiments, the process 500 can include some or all operations described with respect to FIGS. 3 and 4.

At 502, a creation request to create a promotion event is received by a node of a blockchain network (e.g., a node of the blockchain network 306). The promotion event is associated with multiple promotion codes. In some embodiments, the creation request is received, for example, from a merchant server (e.g., the merchant server 304).

In some embodiments, the promotion event is associated with a pair of a private key and a public key for identifying and authenticating the promotion event. In some embodiments, the private key can be used to generate a digital signature for each of the multiple promotion codes so as to provide enhanced data security of the multiple promotion codes. The public key can be used to verify the validity of the promotion code based on the public key and the digital signature of the promotion event. In some embodiments, the private key can be used to generate a digital signature for each of the multiple promotion codes by signing the each of the multiple promotion codes, a hash generated based on the each of the multiple promotion codes, or some variants of the each of the multiple promotion codes. The public key of the promotion event can be used to decrypt the digital signature and extract the each of the multiple promotion codes.

In some embodiments, the creation request includes the public key and a digital signature generated using the private key. The digital signature can be generated, for example, by the merchant server by generating a hash based on some or all of the information included in the creation request and signing the hash using the private key. In some embodiments, the creation request can further include rules of the promotion event, such as the rules described with respect to FIG. 3. For example, the rules include one or more of: an identifier (ID) of the promotion event, a total number of the multiple promotion codes, a range of the multiple promotion codes, a type of each of the multiple promotion codes, a spelling rule of a valid promotion code, an expiration time of the promotion event, a region of the promotion event, or a qualification of a person for redemption of one of the multiple promotion codes.

At 504, the validity of the creation request is determined by the node and based on the public key and the digital signature generated using the private key. In some embodiments, as an example, the node can use the public key to decrypt the digital signature and extract a hash from the digital signature. The node can also generate a hash based on the some or all of the information included in the creation request. The validity of the creation request can be determined in response to determining that the public key can decrypt the digital signature and the hash extract from the digital signature matches the hash generated by the node.

At 506, in response to determining that the creation request is valid, the promotion event is registered by the node in the blockchain network using a smart contract without storing the multiple promotion codes in the blockchain network. In some embodiments, registering the promotion event in the blockchain network using a smart contract includes: inputting, by the node, the rules into one or more functions of the smart contract; executing, by the node, the one or more functions of the smart contract; and storing, by the node, the rules in the blockchain network.

In some embodiments, registering the promotion event in the blockchain network using a smart contract includes calling and executing one or more logics, functions, or other operations defined in the smart contract for creating the promotion event in the blockchain network. For example, a smart contract that defines multiple operations for the promotion event can be generated and deployed in the blockchain network. The multiple operations of the smart contract can include one or more of, for example, a promotion event creation operation, a promotion event verification operation, a promotion code verification operation, a promotion code redemption operation, or a redemption record inquiry operation. In some embodiments, each of the operations can be implemented as an application programming interface (API), a service, a function, or a combination thereof. The operations be specified using routines, data structures, and object classes of one or more computer languages. In some embodiments, a node can execute an operation defined in the smart contract by calling the operation and inputting one or more parameters or arguments into the operation.

At 508, an acknowledgement indicating a success of creation of the promotion event is returned by the node, for example, to the merchant server, in response to the registration of the promotion event in the blockchain network using the smart contract.

At 510, a redemption request to redeem a promotion code of the multiple promotion codes is received by the node. The redemption request includes the promotion code, an identifier (ID) of the promotion event, and a digital signature of the redemption request signed using the private key. The digital signature of the redemption request can be generated, for example, by generating a hash based on some or all of the information included in the redemption request and signing the hash using the private key. In some embodiments, the redemption request can include additional or different information. In some embodiments, the multiple promotion codes are generated at a same time, whereas two or more redemption requests to redeem two or more of the multiple promotion codes are received by the node at different times.

At 512, the public key of the promotion event and the rules are identified by the node and based on the ID of the promotion event.

At 514, it is determined by the node whether the redemption request is valid based on the digital signature of the redemption request signed and the public key. In some embodiments, as an example, the node can use the public key to decrypt the digital signature of the redemption request and extract a hash from the digital signature of the redemption request. The node can also generate a hash based on the some or all of the information included in the redemption request. The validity of the creation request can be determined in response to determining that the public key can decrypt the digital signature of the redemption request and the hash extract from the digital signature matches the hash of generated by the node based on the some or all of the information included in the redemption request.

At 518, in response to determining that the redemption request is valid, a notification is returned, for example, to the merchant server, indicating that the redemption request is invalid. In some embodiments, the node determines that the redemption request is invalid, for example, in response to determining that the public key cannot decrypt the digital signature of the redemption request, the hash extract from the digital signature does not match the hash of generated by the node based on the some or all of the information included in the redemption request, or both.

At 520, in response to determining that the redemption request is valid, it is determined by the node based on the rules whether the promotion code is valid by executing the smart contract. For example, whether the promotion code is valid can be determined by the node by invoking one or more promotion code verification operations defined in the smart contract. The promotion code verification operations can check, for example, whether the promotion code is within the range defined by the rules, the promotion code complies with the spelling rule defined by the rules, etc.

At 521, in response to determining that the promotion code is invalid, a notification is returned, for example, to the merchant server, indicating that the promotion code is invalid.

At 522, in response to determining that the promotion code is valid, it is determined by the node if the promotion code has been redeemed according to a redemption history of the promotion event by executing the smart contract.

At 523, in response to determining that the promotion code has been redeemed, a notification is returned, for example, to the merchant server, indicating that the promotion code has been redeemed.

At 524, in response to determining that the promotion code is valid and has not been redeemed, an acknowledgement is returned, for example, to the merchant server, indicating a success of redemption of the promotion code. In some embodiments, redemption of the promotion code is recorded in the blockchain network.

Figure 6:
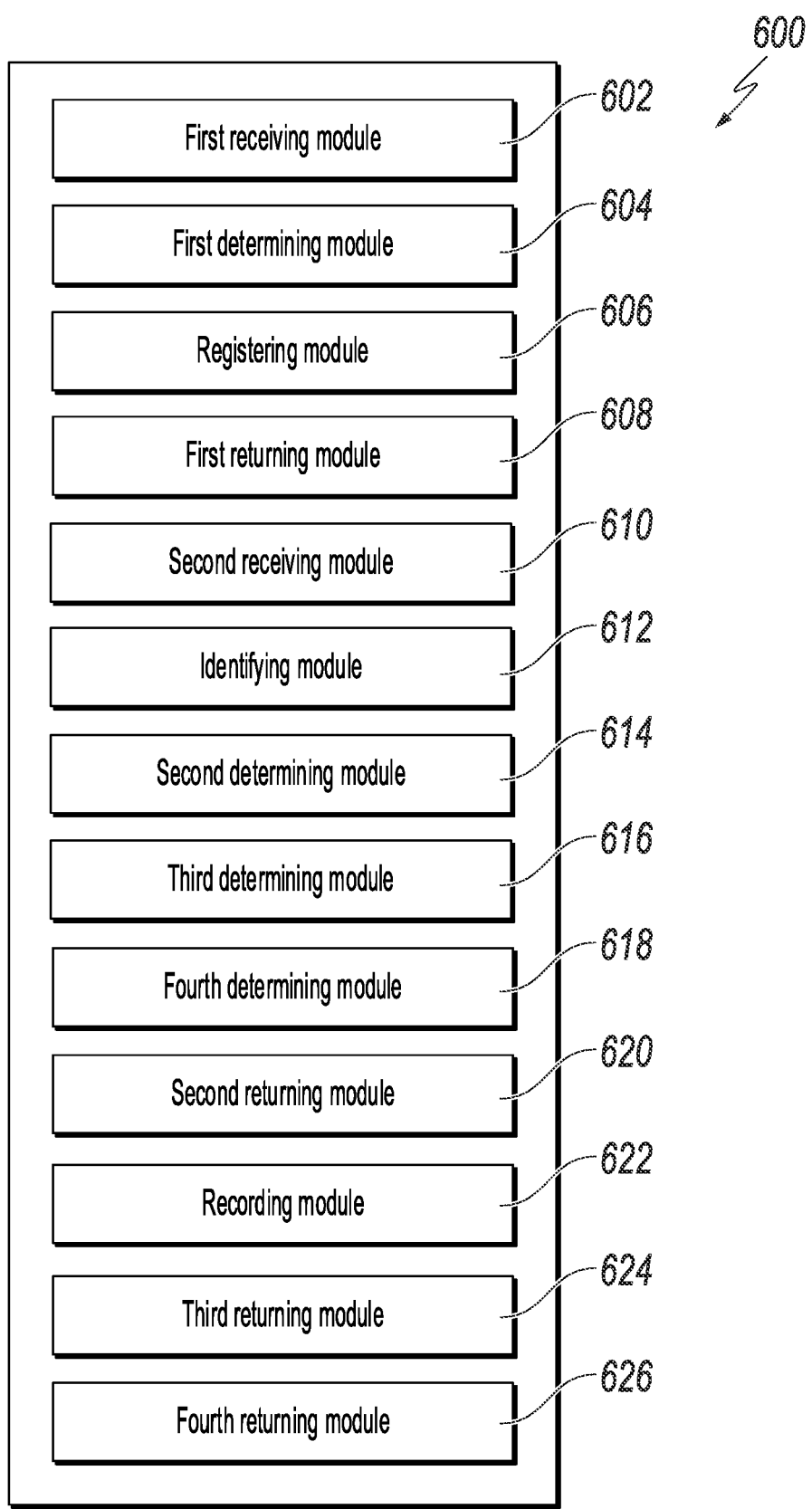
FIG. 6 depicts examples of modules of an apparatus in accordance with embodiments of this specification.

FIG. 6 is a diagram of an example of modules of an apparatus 600 in accordance with embodiments of this specification. The apparatus 600 can be an example of an embodiment of a node in a blockchain network for product promotion using a smart contract in a blockchain network. The apparatus 600 can correspond to the embodiments described above, and the apparatus 600 includes the following: a first receiving module 602 for receiving, by a node of a blockchain network, a creation request to create a promotion event, wherein: the promotion event is associated with multiple promotion codes, the promotion event is associated with a pair of a private key and a public key for identifying the promotion event, and the creation request includes the public key and a digital signature generated using the private key; a first determining module 604 for determining, by the node and based on the public key and the digital signature, the validity of the creation request; and a registering module 606 for registering, by the node, the promotion event in the blockchain network using a smart contract without storing the multiple promotion codes in the blockchain network in response to determining that the creation request is valid.

In an optional embodiment, the apparatus 600 further includes the following: a first returning module 608 for returning, by the node, an acknowledgement indicating a success of creation of the promotion event.

In an optional embodiment, the creation request further includes rules of the promotion event, and wherein the registering module 606 includes an inputting sub-module for inputting, by the node, the rules into one or more functions of the smart contract; an executing sub-module for executing, by the node, the one or more functions of the smart contract; and a storing sub-module for storing, by the node, the rules in the blockchain network.

In an optional embodiment, the rules include one or more of: an identifier (ID) of the promotion event, a total number of the multiple promotion codes, a range of the multiple promotion codes, a type of each of the multiple promotion codes, a spelling rule of a valid promotion code, an expiration time of the promotion event, a region of the promotion event, or a qualification of a person for redemption of one of the multiple promotion codes.

In an optional embodiment, the apparatus 600 further includes the following: a second receiving module 610 for receiving, by the node, a redemption request to redeem a promotion code of the multiple promotion codes, wherein the redemption request includes the promotion code, an identifier (ID) of the promotion event, and a digital signature of the redemption request signed using the private key; an identifying module 612 for identifying, by the node and based on the ID of the promotion event, the public key of the promotion event and the rules; a second determining module 614 for determining, by the node, that the redemption request is valid based on the digital signature of the redemption request and the public key.

In an optional embodiment, the apparatus 600 further includes the following: a third determining module 616 for determining, by the node and based on the rules, if the promotion code is valid by executing the smart contract.

In an optional embodiment, the apparatus 600 further includes the following: a fourth determining module 618 for determining, by the node, if the promotion code has been redeemed according to a redemption history of the promotion event by executing the smart contract.

In an optional embodiment, the apparatus 600 further includes the following: a second returning module 620 for returning an acknowledgement indicating a success of redemption of the promotion code in response to determining that the promotion code is valid and has not been redeemed, and a recording module 622 for recording redemption of the promotion code in the blockchain network.

In an optional embodiment, the apparatus 600 further includes the following: a third returning module 624 for returning a notification indicating the promotion code is invalid in response to determining that the promotion code is invalid.

In an optional embodiment, the apparatus 600 further includes the following: a fourth returning module 626 for returning a notification indicating that the promotion code has been redeemed in response to determining that the promotion code has been redeemed.

In an optional embodiment, the multiple promotion codes are generated at a same time, and the second receiving module 610 receives, by the node, two or more redemption requests to redeem two or more of the multiple promotion codes at different times.

The system, apparatus, module, or unit illustrated in the previous embodiments can be implemented by using a computer chip or an entity, or can be implemented by using a product having a certain function. A typical embodiment device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an embodiment process of functions and roles of each module in the apparatus, references can be made to an embodiment process of corresponding steps in the previous method. Details are omitted here for simplicity.

Because an apparatus embodiment basically corresponds to a method embodiment, for related parts, references can be made to related descriptions in the method embodiment. The previously described apparatus embodiment is merely an example. The modules described as separate parts may or may not be physically separate, and parts displayed as modules may or may not be physical modules, may be located in one position, or may be distributed on a number of network modules. Some or all of the modules can be selected based on actual demands to achieve the objectives of the solutions of the specification. A person of ordinary skill in the art can understand and implement the embodiments of the present application without creative efforts.

Referring again to FIG. 6, it can be interpreted as illustrating an internal functional module and a structure of a blockchain smart contract promotion event management apparatus. The blockchain smart contract promotion management apparatus can be an example of a blockchain node for product promotion using a smart contract in a blockchain network. An execution body in essence can be an electronic device, and the electronic device includes the following: one or more processors and a memory configured to store an executable instruction of the one or more processors.

The techniques described in this specification produce one or more technical effects. In some embodiments, product promotion can be implemented using a smart contract in a blockchain network. In some embodiments, a merchant (e.g., a brand owner, a retailer, a wholesaler, or a manufacturer) can create a promotion event, for example, for marketing purposes. In some embodiments, the merchant can issue a number of digital or electronic tickets (e.g., an electronic voucher, an electronic coupon, or an electronic gift certificate) for the promotion event. Each of the digital ticket can be associated with a unique promotion code. Each of the promotion code can be signed, for example, using a private key corresponding to the promotion event for verifying the validity of the promotion code. As such, any promotion code generated by third parties without the private key of the promotion event cannot be verified as a valid promotion code. As such, even if the spelling rules of the promotion codes are deciphered, a digital ticket cannot be redeemed without a valid signature signed using the private key of the promotion event of an authorized merchant. Thus, counterfeits of the promotion codes are deterred and data security can be enhanced.

In some embodiments, a smart contract can be used to implement the promotion event in a blockchain network (referred to as a smart contract-based promotion event) to facilitate creation of the promotion events by the merchant and redemption of a digital ticket by a consumer. In some embodiments, unlike a conventional scheme that stores a large number of promotion codes of the promotion event, the smart contract-based promotion event does not need to store any promotion codes in the blockchain, thus saving storage space and computational resources of the blockchain network. In some embodiments, the smart contract-based promotion event can offload and reduce the computation load of the blockchain network from a creation stage of the promotion event to the redemption stage of a promotion code of the promotion event. Typically, a large number of promotion codes of the promotion event are generated at once, for example, at the same time during the creation stage of the promotion event. By contrast, redemption of different promotion codes of the promotion event typically happens at different times, for example, by different consumers. In some embodiments, the smart contract-based promotion event can avoid concurrently uploading and storing the promotion codes to the blockchain network, thus not imposing a computational burden on the blockchain network.

In some embodiments, the smart contract-based promotion event can provide enhanced data security in protecting the digital tickets from being leaked or maliciously deciphered because the promotion codes themselves are not stored.

In some embodiments, the smart contract-based promotion event allows inspection of a redemption history of each of the digital ticket, thus providing improved transparency of the promotion event.

Described embodiments of the subject matter can include one or more features, alone or in combination.

For example, in a first embodiment, a computer-implemented method for product promotion using a smart contract in a blockchain network, the method includes: receiving, by a node of a blockchain network, a creation request to create a promotion event, wherein: the promotion event is associated with multiple promotion codes, the promotion event is associated with a pair of a private key and a public key for identifying the promotion event, and the creation request includes the public key and a digital signature generated using the private key; determining, by the node and based on the public key and the digital signature, the validity of the creation request; and in response to determining that the creation request is valid, registering, by the node, the promotion event in the blockchain network using a smart contract without storing the multiple promotion codes in the blockchain network. The foregoing and other described embodiments can each, optionally, include one or more of the following features:

A first feature, combinable with any of the following features, specifies that the creation request further includes rules of the promotion event, and wherein registering, by the node, the promotion event in the blockchain network using a smart contract includes: inputting, by the node, the rules into one or more functions of the smart contract; executing, by the node, the one or more functions of the smart contract; and storing, by the node, the rules in the blockchain network.

A second feature, combinable with any of the previous or following features, specifies that the rules include one or more of: an identifier (ID) of the promotion event, a total number of the multiple promotion codes, a range of the multiple promotion codes, a type of each of the multiple promotion codes, a spelling rule of a valid promotion code, an expiration time of the promotion event, a region of the promotion event, or a qualification of a person for redemption of one of the multiple promotion codes.

A third feature, combinable with any of the previous or following features, specifies that the method further includes receiving, by the node, a redemption request to redeem a promotion code of the multiple promotion codes, wherein the redemption request includes the promotion code, an identifier (ID) of the promotion event, and a digital signature of the redemption request signed using the private key; identifying, by the node and based on the ID of the promotion event, the public key of the promotion event and the rules; determining, by the node, that the redemption request is valid based on the digital signature of the redemption request and the public key.

A fourth feature, combinable with any of the previous or following features, specifies that the method further including determining, by the node and based on the rules, if the promotion code is valid by executing the smart contract.

A fifth feature, combinable with any of the previous or following features, specifies that the method further including determining, by the node, if the promotion code has been redeemed according to a redemption history of the promotion event by executing the smart contract.

A sixth feature, combinable with any of the previous or following features, specifies that the method further includes, in response to determining that the promotion code is valid and has not been redeemed: recording redemption of the promotion code in the blockchain network; and returning an acknowledgement indicating a success of redemption of the promotion code.

A seventh feature, combinable with any of the previous or following features, specifies that the method further includes, in response to determining that the promotion code is invalid, returning a notification indicating the promotion code is invalid.

An eighth feature, combinable with any of the previous or following features, specifies that the method further including in response to determining that the promotion code has been redeemed, returning a notification indicating that the promotion code has been redeemed.

A ninth feature, combinable with any of the previous or following features, specifies that the multiple promotion codes are generated at a same time, and the computer-implemented method further includes: receiving, by the node, two or more redemption requests to redeem two or more of the multiple promotion codes at different times.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. For example, a computer program carrier can include one or more computer-readable storage media that have instructions encoded or stored thereon. The carrier may be a tangible non-transitory computer-readable medium, such as a magnetic, magneto optical, or optical disk, a solid state drive, a random access memory (RAM), a read-only memory (ROM), or other types of media. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

Processors for execution of a computer program include, by way of example, both general- and special-purpose microprocessors, and any one or more processors of any kind of digital computer. Generally, a processor will receive the instructions of the computer program for execution as well as data from a non-transitory computer-readable medium coupled to the processor.

The term "data processing apparatus" encompasses all kinds of apparatuses, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

The processes and logic flows described in this specification can be performed by one or more computers or processors executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more storage devices. The storage devices can be, for example, magnetic, magneto optical, or optical disks, solid state drives, or any other type of non-transitory, computer-readable media. However, a computer need not have such devices. Thus, a computer may be coupled to one or more storage devices, such as, one or more memories, that are local and/or remote. For example, a computer can include one or more local memories that are integral components of the computer, or the computer can be coupled to one or more remote memories that are in a cloud network. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Components can be "coupled to" each other by being commutatively such as electrically or optically connected to one another, either directly or via one or more intermediate components. Components can also be "coupled to" each other if one of the components is integrated into the other. For example, a storage component that is integrated into a processor (e.g., an L2 cache component) is "coupled to" the processor.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific embodiment details, these should not be construed as limitations on the scope of what is being claimed, which is defined by the claims themselves, but rather as descriptions of features that may be specific to particular embodiments. Certain features that are described in this specification in the context of separate embodiments can also be realized in combination in a single embodiment. Conversely, various features that are described in the context of a single embodiments can also be realized in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for product promotion using a smart contract in a blockchain network, the method comprising:
   receiving, by a node of a blockchain network, a creation request to create a promotion event, wherein:
      the promotion event is associated with a plurality of promotion codes,
      the promotion event is associated with a pair of a private key and a public key for identifying the promotion event, and
      the creation request comprises the public key, a digital signature generated using the private key, and one or more rules of the promotion event;
   determining, by the node and based on the public key and the digital signature, validity of the creation request; and
   in response to determining that the creation request is valid, registering, by the node, the promotion event in the blockchain network using a smart contract, comprising:
      inputting, by the node, the rules into one or more functions of the smart contract;
      executing, by the node, the one or more functions of the smart contract; and
      storing, by the node, the rules in the blockchain network without storing the plurality of individual promotion codes in the blockchain network;
   receiving, by the node, a redemption request to redeem a promotion code of the plurality of promotion codes, wherein the redemption request comprises the promotion code, an identifier (ID) of the promotion event, and a digital signature of the redemption request signed using the private key;
   identifying, by the node and based on the ID of the promotion event, the public key of the promotion event and the rules;
   determining, by the node, that the redemption request is valid based on the digital signature of the redemption request and the public key; and
   after determining that the redemption request is valid, transmitting a notification indicating a success of the redemption request based at least on executing the smart contract.

2. The computer-implemented method of claim 1, wherein the rules comprise one or more of: an identifier (ID) of the promotion event, a total number of the plurality of promotion codes, a range of the plurality of promotion codes, a type of each of the plurality of promotion codes, a spelling rule of a valid promotion code, an expiration time of the promotion event, a region of the promotion event, or a qualification of a person for redemption of one of the plurality of promotion codes.

3. The computer-implemented method of claim 1, further comprising:
   determining, by the node and based on the rules, if the promotion code is valid by executing the smart contract.

4. The computer-implemented method of claim 3, further comprising:
   determining, by the node, if the promotion code has been redeemed according to a redemption history of the promotion event by executing the smart contract.

5. The computer-implemented method of claim 4, further comprising:
   in response to determining that the promotion code is valid and has not been redeemed:

recording redemption of the promotion code in the blockchain network; and returning an acknowledgement indicating a success of redemption of the promotion code.

6. The computer-implemented method of claim 3, further comprising:

in response to determining that the promotion code is invalid, returning a notification indicating the promotion code is invalid.

7. The computer-implemented method of claim 4, further comprising:

in response to determining that the promotion code has been redeemed, returning a notification indicating that the promotion code has been redeemed.

8. The computer-implemented method of claim 1, wherein the plurality of promotion codes are generated at a same time, and the computer-implemented method further comprises:

receiving, by the node, two or more redemption requests to redeem two or more of the plurality of promotion codes at different times.

9. A non-transitory, computer-readable storage medium storing one or more instructions executable by a computer system to perform operations for product promotion using a smart contract in a blockchain network, the operations comprising:

receiving, by a node of a blockchain network, a creation request to create a promotion event, wherein:
the promotion event is associated with a plurality of promotion codes,
the promotion event is associated with a pair of a private key and a public key for identifying the promotion event, and
the creation request comprises the public key, a digital signature generated using the private key, and one or more rules of the promotion event;

determining, by the node and based on the public key and the digital signature, validity of the creation request; and in response to determining that the creation request is valid, registering, by the node, the promotion event in the blockchain network using a smart contract, comprising:
inputting, by the node, the rules into one or more functions of the smart contract;
executing, by the node, the one or more functions of the smart contract; and
storing, by the node, the rules in the blockchain network without storing the plurality of individual promotion codes in the blockchain network;

receiving, by the node, a redemption request to redeem a promotion code of the plurality of promotion codes, wherein the redemption request comprises the promotion code, an identifier (ID) of the promotion event, and a digital signature of the redemption request signed using the private key;

identifying, by the node and based on the ID of the promotion event, the public key of the promotion event and the rules;

determining, by the node, that the redemption request is valid based on the digital signature of the redemption request and the public key; and after determining that the redemption request is valid, transmitting a notification indicating a success of the redemption request based at least on executing the smart contract.

10. The non-transitory, computer-readable storage medium of claim 9, wherein the rules comprise one or more of: an identifier (ID) of the promotion event, a total number of the plurality of promotion codes, a range of the plurality of promotion codes, a type of each of the plurality of promotion codes, a spelling rule of a valid promotion code, an expiration time of the promotion event, a region of the promotion event, or a qualification of a person for redemption of one of the plurality of promotion codes.

11. The non-transitory, computer-readable storage medium of claim 9, the operations further comprising:

determining, by the node and based on the rules, if the promotion code is valid by executing the smart contract.

12. The non-transitory, computer-readable storage medium of claim 11, the operations further comprising:

determining, by the node, if the promotion code has been redeemed according to a redemption history of the promotion event by executing the smart contract.

13. The non-transitory, computer-readable storage medium of claim 12, the operations further comprising:

in response to determining that the promotion code is valid and has not been redeemed:
recording redemption of the promotion code in the blockchain network; and
returning an acknowledgement indicating a success of redemption of the promotion code.

14. The non-transitory, computer-readable storage medium of claim 11, the operations further comprising:

in response to determining that the promotion code is invalid, returning a notification indicating the promotion code is invalid.

15. The non-transitory, computer-readable storage medium of claim 12, the operations further comprising:

in response to determining that the promotion code has been redeemed, returning a notification indicating that the promotion code has been redeemed.

16. The non-transitory, computer-readable storage medium of claim 9, wherein the plurality of promotion codes are generated at a same time, and the operations further comprise:

receiving, by the node, two or more redemption requests to redeem two or more of the plurality of promotion codes at different times.

17. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations for product promotion using a smart contract in a blockchain network, the operations comprising:

receiving, by a node of a blockchain network, a creation request to create a promotion event, wherein:
the promotion event is associated with a plurality of promotion codes,
the promotion event is associated with a pair of a private key and a public key for identifying the promotion event, and
the creation request comprises the public key, a digital signature generated using the private key, and one or more rules of the promotion event;

determining, by the node and based on the public key and the digital signature, validity of the creation request, and in response to determining that the creation request is valid, registering, by the node, the promotion event in the blockchain network using a smart contract, comprising:
  inputting, by the node, the rules into one or more functions of the smart contract;
  executing, by the node, the one or more functions of the smart contract; and
  storing, by the node, the rules in the blockchain network without storing the plurality of individual promotion codes in the blockchain network;
receiving, by the node, a redemption request to redeem a promotion code of the plurality of promotion codes, wherein the redemption request comprises the promotion code, an identifier (ID) of the promotion event, and a digital signature of the redemption request signed using the private key;
identifying, by the node and based on the ID of the promotion event, the public key of the promotion event and the rules;
determining, by the node, that the redemption request is valid based on the digital signature of the redemption request and the public key; and
after determining that the redemption request is valid, transmitting a notification indicating a success of the redemption request based at least on executing the smart contract.

18. The system of claim 17, wherein the rules comprise one or more of: an identifier (ID) of the promotion event, a total number of the plurality of promotion codes, a range of the plurality of promotion codes, a type of each of the plurality of promotion codes, a spelling rule of a valid promotion code, an expiration time of the promotion event, a region of the promotion event, or a qualification of a person for redemption of one of the plurality of promotion codes.

19. The system of claim 17, the operations further comprising:
  determining, by the node and based on the rules, if the promotion code is valid by executing the smart contract.

20. The system of claim 19, the operations further comprising:
  determining, by the node, if the promotion code has been redeemed according to a redemption history of the promotion event by executing the smart contract.

21. The system of claim 20, the operations further comprising:
  in response to determining that the promotion code is valid and has not been redeemed:
    recording redemption of the promotion code in the blockchain network; and
    returning an acknowledgement indicating a success of redemption of the promotion code.

22. The system of claim 19, the operations further comprising:
  in response to determining that the promotion code is invalid, returning a notification indicating the promotion code is invalid.

23. The system of claim 20, the operations further comprising:
  in response to determining that the promotion code has been redeemed, returning a notification indicating that the promotion code has been redeemed.

24. The system of claim 17, wherein the plurality of promotion codes are generated at a same time, and the operations further comprise:
  receiving, by the node, two or more redemption requests to redeem two or more of the plurality of promotion codes at different times.

* * * * *

UNITED STATES PATENT AND TRADEMARK OFFICE
CERTIFICATE OF CORRECTION

PATENT NO. : 10,664,877 B1  
APPLICATION NO. : 16/671076  
DATED : May 26, 2020  
INVENTOR(S) : Zhiyuan Feng, Yanpeng Li and Long Cheng Page 1 of 1

It is certified that error appears in the above-identified patent and that said Letters Patent is hereby corrected as shown below:

In the Claims

In Claim 2, Column 22, Line 46, after "more of:", delete -- an identifier (ID) -- and insert "the ID", therefor.

In Claim 10, Column 24, Line 3, after "of:", delete -- an identifier (ID) -- and insert "the ID", therefor.

In Claim 18, Column 25, Line 29, after "more of:", delete -- an identifier (ID) -- and insert "the ID", therefor.

Signed and Sealed this  
Seventeenth Day of August, 2021

Drew Hirshfeld  
*Performing the Functions and Duties of the*  
*Under Secretary of Commerce for Intellectual Property and*  
*Director of the United States Patent and Trademark Office*